(12) United States Patent
Dissing

(10) Patent No.: US 9,091,084 B2
(45) Date of Patent: Jul. 28, 2015

(54) FASTENING OF A CORRUGATED SHEET IN A ROOF CONSTRUCTION OR WALL CONSTRUCTION

(71) Applicant: Dissing A/S, Skanderborg (DK)

(72) Inventor: Claus Hornstrup Dissing, Ry (DK)

(73) Assignee: Dissing A/S, Skanderborg (DK)

( * ) Notice: Subject to any disclaimer, the term of this patent is extended or adjusted under 35 U.S.C. 154(b) by 0 days.

(21) Appl. No.: 14/346,042

(22) PCT Filed: Sep. 20, 2012

(86) PCT No.: PCT/DK2012/050350
§ 371 (c)(1),
(2) Date: Mar. 20, 2014

(87) PCT Pub. No.: WO2013/041107
PCT Pub. Date: Mar. 28, 2013

(65) Prior Publication Data
US 2014/0366473 A1 Dec. 18, 2014

(30) Foreign Application Priority Data

Sep. 20, 2011 (DK) .................................. 2011 70513

(51) Int. Cl.
| | |
|---|---|
| *F16B 25/02* | (2006.01) |
| *E04F 13/21* | (2006.01) |
| *E04D 3/36* | (2006.01) |
| *F16B 25/00* | (2006.01) |
| *F16B 43/00* | (2006.01) |
| *F16B 35/00* | (2006.01) |
| *F16B 25/10* | (2006.01) |

(52) U.S. Cl.
CPC .............. *E04F 13/21* (2013.01); *E04D 3/3606* (2013.01); *F16B 25/0031* (2013.01); *F16B 35/00* (2013.01); *F16B 43/001* (2013.01); *F16B 25/0084* (2013.01); *F16B 25/103* (2013.01); *Y10T 29/49629* (2015.01)

(58) Field of Classification Search
CPC .... E04D 3/3606; E04F 13/21; F16B 25/0031; F16B 25/0084; F16B 25/103; F16B 25/106; F16B 35/00; F16B 43/001; F16B 35/041; F16B 35/06; F16B 35/065; Y10T 29/49629
See application file for complete search history.

(56) References Cited

U.S. PATENT DOCUMENTS

| | | | | |
|---|---|---|---|---|
| 3,965,793 | A | * | 6/1976 | Roser ............................ 411/386 |
| 5,304,024 | A | * | 4/1994 | Schuster ...................... 411/418 |
| 2011/0167757 | A1 | * | 7/2011 | Vandenberg ............... 52/745.21 |
| 2014/0010618 | A1 | * | 1/2014 | Sheu et al. ................. 411/387.2 |
| 2014/0023455 | A1 | * | 1/2014 | Park ............................ 411/387.7 |

FOREIGN PATENT DOCUMENTS

| | | |
|---|---|---|
| AU | 2004208673 A1 | 3/2005 |
| DK | 2006 00177 U3 | 10/2007 |
| EP | 0 058 211 A1 | 8/1982 |
| FR | 2 564 916 A1 | 11/1985 |

* cited by examiner

*Primary Examiner* — Alexander P Taousakis
(74) *Attorney, Agent, or Firm* — Roberts Mlotkowski Safran & Cole, P.C.; David S. Safran

(57) ABSTRACT

A corrugated sheet in a roof construction or wall construction is fastened to an underlying support structure by a screw extending through the sheet or wall construction and into the support structure. The screw includes a head, a washer, and a threading. The washer includes an upper metallic cap and an underlying sealant.

9 Claims, 5 Drawing Sheets

Linalux can be nailed easily. But have to be nailed vertically through the top of the corrugation. Do not nail too deep.
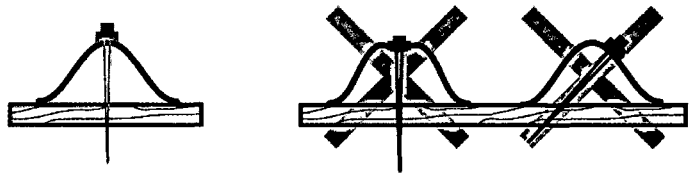
The sheet should be nailed in each of the overlapping corrugations and in the uppermost and in following sequence.
FIG. 9 PRIOR ART - Copy of instruction manual of Linalux

FASTENING OF A CORRUGATED SHEET IN A ROOF CONSTRUCTION OR WALL CONSTRUCTION

BACKGROUND OF THE INVENTION

1. Field of the Invention

The present invention concerns a method for fastening of sheets made of bitumen or similar corresponding materials to underlying support structure. The invention also relates to a roof construction and to a screw therefore.

2. Description of Related Art

Corrugated metal sheets or corrugated sheets made of plastic or cement on roofs are typically low cost solutions and have corresponding popularity. Such corrugated sheets are typically fastened by screws. French patent document FR2564916 discloses such fastening, where one type of screw is disclosed for wood constructions, where the screw has a winding that extends to the tip, and another screw is disclosed for metal constructions, where the screw has a drill point at the tip. The screw has a head and a washer for tightening against the sheet. An alternative washer is found in European patent application EP0058211.

The above mentioned French patent document FR2564916 discloses two screws, one for wood and one for metal. The drill screw in French patent document FR2564916 is not useful for wood construction, because the drill point has a diameter larger than the stem of the screw, such that the winding would not have sufficient power to hold the screw in wood. Both of the screws are provided with wings for increasing the hole diameter of the sheet. This is so because plastic sheets expand and contract substantially on temperature shifts and also have a tendency to move on the roof, and the hole should tolerate such movement.

An improvement in screws for fastening plastic or metal sheets is found in Danish utility model DK200600177U3, which discloses a screw having a tip with a drill that has a reduced diameter relatively to the diameter of the screw stem. The idea behind such construction is that the drill is stable enough to drill through thin steel constructions but not so large that it compromises stability when screwing into wood construction.

Thus, the technology of fastening corrugated sheets of metal, cement or plastic onto roof constructions has involved remarkable development of screws.

Similar considerations on fastening improvements have not been found in connection with corrugated Bitumen sheets, which are nailed into the roof construction. This appears also clearly from the instructions by one of the largest producer of Bitumen sheets, LINALUX; an instruction manual is published on the Internet site www.linalux.com, and part of it is reproduced in FIG. 9. This is so, despite the fact that across the world, millions of corrugated Bitumen sheets are each year being used as roofing material in private housing, industrial building projects, for storage facilities, ad garden houses.

In connection with bitumen sheets, it should be mentioned that the screws in French patent document FR2564916 have wings for increasing the hole through the sheet, which is not useful for bitumen, because the bitumen would not tighten against the screw stem.

Thus, traditionally, corrugated bitumen sheets have been fastened to wood substructures with nails with various non-metallic heads (for example PVC) where the deformation of each said head on top of the corrugation acts as the only means of sealing against rain.

The fastening with nails is time consuming and is not in line with the more modern method of fastening with threaded screw products. As it is recommended that each corrugation on said sheets is fastened to the substructure individually, it means that the extra time consumed using nails is substantial.

Furthermore fastening with nails has the major disadvantage that it lacks precision and cannot be reversed if needed. If during the fastening of the above said sheets the nail goes a little too far into the substructure, it poses a very real problem—as it cannot be pulled backwards without destroying the nail and in some instances both substructure and sheet.

The non-metallic heads mentioned above have historically proven to be problematic. UV radiation from the sun has discolored the heads and/or made them brittle—ultimately causing heads to simply disappear and/or be so damaged they do no longer perform the functions for which they were intended.

Further to the pure functional purposes, there are also several esthetic problems with the above mentioned non-metallic heads. They are typically quite large in order to resist the hammering and this means they are very visible on the roof, which is undesirable.

It is easy to change the color of the Bitumen sheets, whenever a special requirement comes along. However with the solution with non-metallic heads, like plastic molded PVC heads, this presents a logistical challenge, as special color PVC granulate will have to be bought and molded, which is typically something that requires large volumes and very long lead times.

Optimal sealing has always been a known problem with previous solutions where the deformation of the head against the corrugation itself is the only means of sealing. Therefore, unsuccessful attempts have been made by sealing with traditional neoprene, EPDM, and/or similar materials that are normally widely used in the building industry. The main problem however is that neoprene is not very UV resistant and that EPDM is slowly dissolved when it is in contact with oil based products, such as bitumen.

As it appears from above, there is a need for improvements on the art.

SUMMARY OF THE INVENTION

It is the object of this invention to provide a new type of fastening of the bitumen sheets to a support, typically in a roof construction.

This object is achieved by a method for fastening corrugated sheets on an underlying support structure as part of a roof construction or wall construction by a screw extending through the sheet and extending into the support structure, preferably without providing a hole for the screw first. Thus, the screw is used to cut its own way through the corrugated sheet. The screw has a head, a washer, and a threading. The invention is useful for flexible corrugated sheets, especially flexible corrugated bitumen sheets.

Optionally, the washer comprises an upper metallic cap and an underlying sealant. For example, the metallic cap has a concave lower side, and the underlying sealant has a convex upper side largely corresponding to the concave lower side of the metallic cap in order for the upper side of the sealant to be accommodated by the concave lower side of the metallic cap. A further option is an upwardly directed central concavity in the metallic cap in order to accommodate the screw head, for example for accommodating a lower conical part of the screw head. The washer may be provided between the head and the threading or the washer is an integrated part of the head.

For example, the screw has a head and stem and a threading as part of the stem. Further, the screw has a washer comprising an upper metallic cap and an underlying sealant, wherein the upper metallic cap is formed with a downwardly concave ring, and the underlying sealant has a convex upper side largely corresponding to the concave ring of the metallic cap in order for the upper side of the sealant to be accommodated by the concave lower side of the metallic cap. The metallic cap and the sealant has a central hole for accommodating the stem of the screw, wherein the head has a lower part gradually narrowing from the outermost end of the head and towards the stem head, and the washer has an upper hollow correspondingly gradually narrowing and accommodating the lower part of the head in the upper hollow.

A suitable material for the sealant is nitrile butadiene rubber (NBR), because this is a material that is resistant to aggressive substances in the bitumen, which extends the lifetime of the screw as compared to the typically used ethylene propylene diene monomer (EPDM) rubber.

The metallic cap is advantageously made of aluminium due to its high corrosion resistance, although, other metals can also be useful. Optionally, the threading is a double thread with two threads being intertwined along the screw. Advantageously, the screw is covered by a corrosion resistant surface layer, for example zinc layer. A typical thickness of the zinc layer is 10-15 micrometer. In order to adjust the colour of the screw to the colour of the sheets, the head is painted, for example powder painted.

Alternatively, the washer is provided in polymer, for example polyvinylchloride (PVC).

The invention provides the users with a product with the following advantages:
  Much faster to install—saves time
  A better technical solution—e.g. with NBR as sealing solution
  Easier to use—e.g. can be dismounted again
  Visually much better looking on the roof
  Possibility to match special colors of roofs almost immediately—flexibility Applications are typically lightweight corrugated sheets for roofs or walls of buildings, such as residential, industrial, or agricultural buildings. Such lightweight corrugated sheets are typically made of a polymer, for example bitumen, and are flexible. A typical weight of the sheet is less than 5 kg/m2, for example less than 4 kg/m2.

The invention will be explained in more detail with reference to the drawing, where

BRIEF DESCRIPTION OF THE DRAWINGS

FIG. 9 is a reproduced part of a prior art instruction manual by Linalux (www.linalux.com).

DETAILED DESCRIPTION OF THE INVENTION

Figure 1:
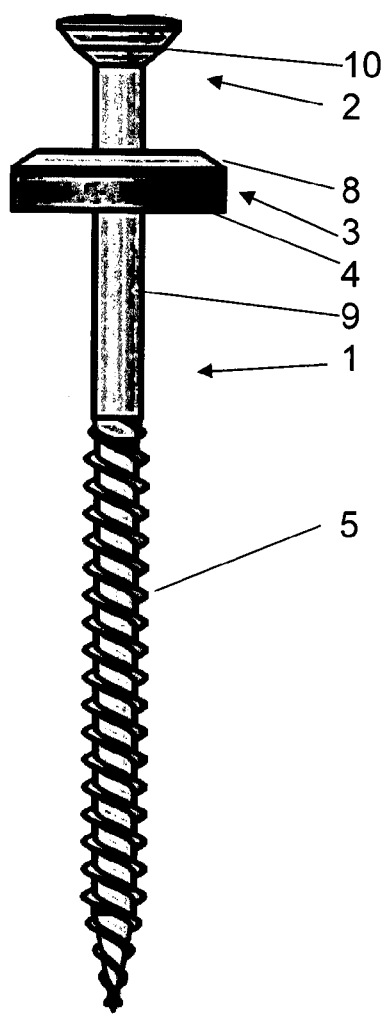
FIG. 1 is an image of the invention as full finished solution. Double thread, special M-washer, NBR sealant, special countersunk head.

FIG. 1 illustrates a fastener 1 of the threaded type (screw) with a special designed head 2 and a washer 3 with a metallic cap 8 and an underlying sealant 4, where the visible parts of the head section of such fastener solution is colored in colors matching the color of the sheets.

The threading 5 as part of the stem 9 of the screw is not limited to only one type of threading (e.g. for wood), but applies also for threadings made for tapping into steel substructures with or without drill point, etc. However for the purpose of the drawing attached to this application and for maximizing the speed of fastening, a so-called double threading for wood substructures has been chosen.

Figure 2:
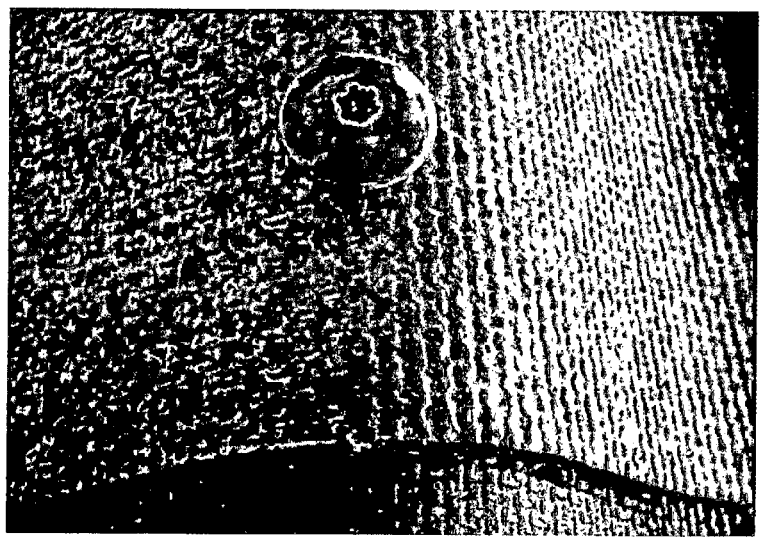
FIG. 2 illustrates an example of a large diameter solution.

The metallic washer 3 can be made of aluminum, galvanized steel and/or any other similar material. It can also be an integrated part of the screw 1 (large head diameter—see FIG. 2). As illustrated in FIGS. 1 and 2, a separate washer solution has been chosen, which further provides the advantage that even if the screw is driven in at a slightly tilted angle, the washer will still lie flat against the roof, continuously providing the sealing effect, which is best understood in connection with FIG. 3, also illustrating a bitumen sheet 6 through which the screw extends.

Figure 3:
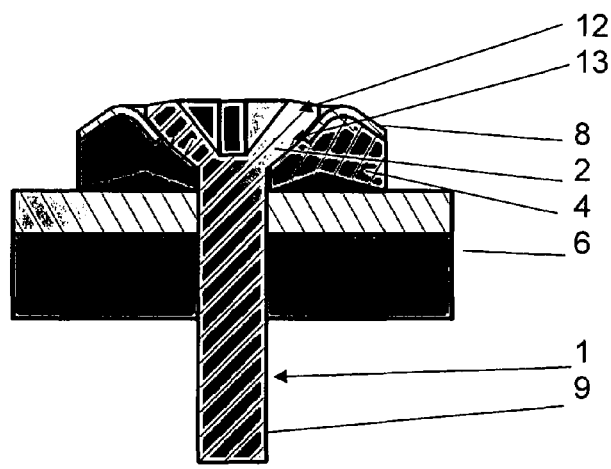
FIG. 3 is a close-up of image of washer, NBR sealant, head shape and underlying Bitumen sheet.
Figure 5:
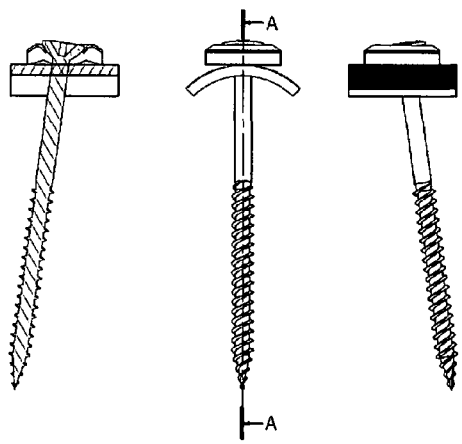
FIG. 5 is an illustration of the screws through bitumen sheet, the screw having an angle deviating from normal to the washer; left image is cross section along A-A.

As illustrated in FIG. 3, the screw has a head 2 and stem 9 with the threading. The screw 1 has a washer 3 comprising an upper metallic cap 8 and an underlying sealant 4. The upper metallic cap 8 is formed with a downwardly concave ring, and the underlying sealant 4 has a convex upper side largely corresponding to the concave ring of the metallic cap 8 in order for the upper side of the sealant 4 to be accommodated by the concave lower side of the metallic cap 8. The metallic cap 8 and the sealant 4 has a central hole for accommodating the stem 9 of the screw 1; the head 2 has a lower part 12 gradually narrowing from the outermost end of the head 2 and towards the stem 9 head; the washer 4 has an upper hollow 13 correspondingly gradually narrowing towards the centre and accommodating the lower part 12 of the head 2 in the upper hollow 13. This construction is useful in case that the screw is not drilled perpendicularly through the sheet and into the underlying structure but with a skew angle. This is illustrated in greater detail in FIG. 5, showing that a tight connection between the screw and the washer as well as a smooth passage is achieved even in the case where the screw has an angle with the washer that deviates substantially from being perpendicular, for example deviates with 10-30 degrees from being perpendicular.

As it appears from FIG. 3, the sealant has a cross sectional form that resembles the form of the letter M. Thus, when the washer is oriented horizontally with the sealant downwards, the sealant extends inclined upwards from the rim towards the centre and then shifts to be inclined downwards towards the centre. In other words, the sealant has an upwardly narrowing part extending from the rim and towards the centre followed by a downwardly narrowing conical shape towards the centre.

Figure 4:
FIG. 4 is an image of a bitumen sheet with standard nails fixing to the left and to the right a powder painted bitumen sheet fastener according to the invention.

Further to the above section about the choice of washer 3 and head style 2, this also have the much desired effect of giving a visually much better appearance on the finished roof See the visual difference in FIG. 4, which is an image of a bitumen sheet with standard nails fixing to the left and to the right a Powder Painted Bitumen Sheet Fastener according to the invention.

FIG. 4 also shows the possibility of painting the heads, which makes up for a very good match to the underlying Bitumen sheet color. The most optimal solution here is powder painting, which is a very strong solution and also provides the fastener with a further protection against correction than the screw itself+any surface treatment might give. It is also something that can be applied to the said fastener heads with very short notice and in very low volumes. But other means of coloration can be considered. For example—but not limited to—standard wet paint, colorized surface treatment, etc.

For the purpose of this application the underlying sealant claimed is optionally made of nitrile butadiene rubber (NBR) rubber which is highly resistant to oil based products like bitumen and has sufficient UV resistance at the same time. But for the general purpose of the invention it can also be made of neoprene, ethylene propylene diene monomer (EPDM) rubber or similar materials.

Figure 6A:
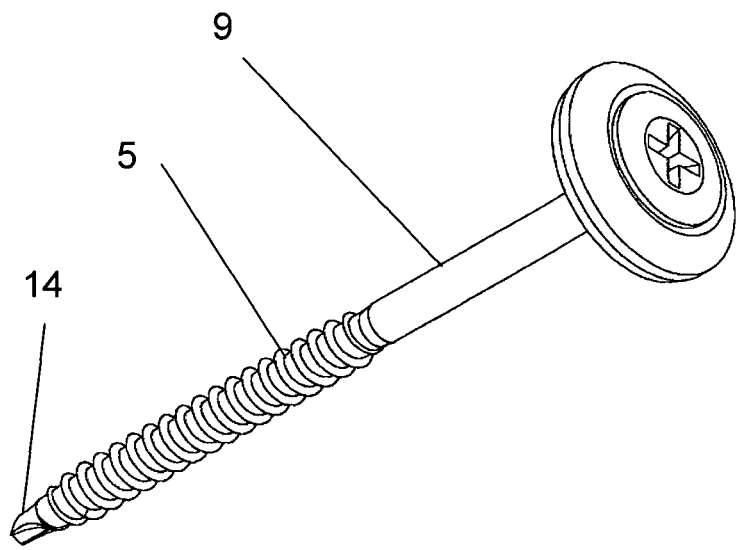
FIGS. 6a, 6b, and 6c illustrate a useful screw in a) perspective view, b) cross sectional view, and c) partial view.
Figure 6B:
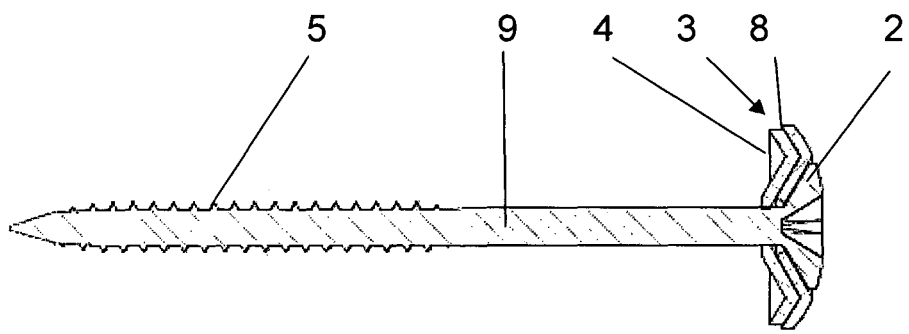
Figure 6C:
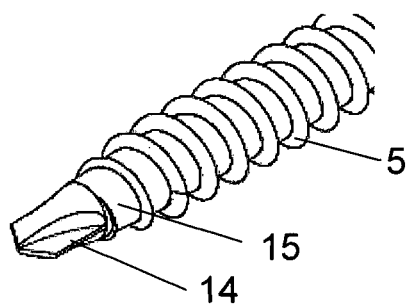

In conclusion to the above, the said invention provides the users with a product with the following advantages:
  Much faster to install—saves time
  A better technical solution—e.g. with NBR as sealing solution
  Easier to use—e.g. can be dismounted again
  Visually much better looking on the roof
  Possibility to match special colors of roofs almost immediately—flexibility A useful screw for corrugated bitumen sheets is illustrated in FIGS. 6a, 6b, and 6c, where FIG. 6a illustrates the screw in a three-dimensional view and FIG. 6b in cross sectional view. This screw has a drill point 14 at its tip, which is shown in greater perspective in FIG. 6c.

Figure 8A:
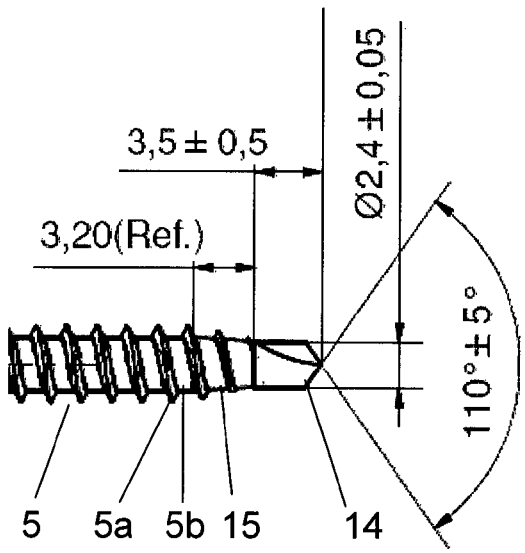
FIGS. 8a and 8b show a) the tip of the screw with a drill point and b) the threading and stem of the screw.
Figure 8B:
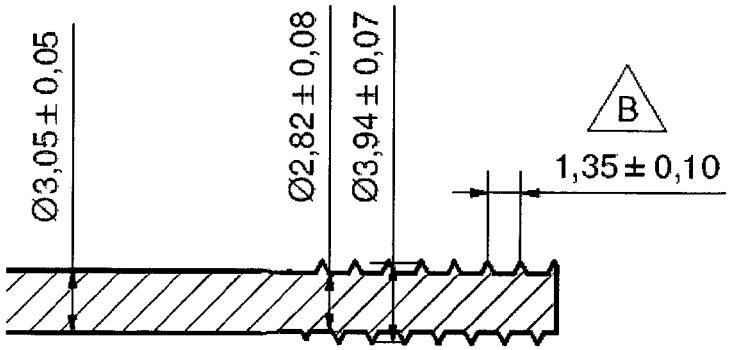

The drill point is useful in cases where the corrugated sheets, especially bitumen sheets, are fasted to a roof construction with steel/iron plates, for example having a thickness of up to 2 mm. In order to have a good fastening to such roof construction, the screw thread has a low pitch, for example of only 135 mm, as illustrated in FIG. 8b. Thus, even in steel plates as part of the roof construction, more than one winding is inside the hole in the steel plate, which yields a stable fastening as compared to screws with higher pitch, which is normally used for corrugated plates, although not commonly for bitumen plates.

As can be seen best in FIG. 6c, the drill point 14 has a diameter which is less than the diameter of the stem 9. For example, the diameter of the drill point is 2.4 mm+/−0.05 mm, and the diameter of the stem is 3.05 mm+/−0.05 mm. When comparing with the thread 5, which comprises a thread stem 5a with a minor diameter, for example 2.8 mm, and a rib 5b with a major diameter for example 3.9 mm, the diameter of the drill point 14 is less than the minor diameter of the threading, the minor diameter being 2.8 mm, for example, and the major diameter (around the rib) is 3.9 mm. Possible dimensions are indicated in FIGS. 8a and 8b. As the drill point 14 has a diameter which is smaller than the minor diameter of the thread, the screw is useful for use in wood, as the drilled hole does not weaken the fastening of the thread 5 in the wood material. The drill point has advantageously a diameter which is at least 10% or 15% smaller than the minor diameter of the threading.

Thus, the fact of the screw having a drill point makes the screw useful for fastening to metal, and the dimensioning of the screw with a drill point having a diameter less than the minor diameter of the threading between the winding makes it useful for wood construction. Advantageously, the threading has a pitch of less than 1.5 mm, for example between 1.2 and 1.5 mm, or between 1.3 and 1.4 mm, or around 1.35 mm.

Such pitch makes it useful for fastening in steel plates of up to 2 mm and is still sufficiently coarse to fasten satisfactory in wood.

Due to the drilling and fastening in steel plates up to 2 mm, the drill point at the tip must be longer than 2 mm. On the other hand, the drill point is advantageously short in order not to dominate the screw when fastening, For this reason, a length of between 3.0 and 4.0 mm has been found useful.

As can be readily seen on FIG. 6c and FIG. 8b, the screw has a transition region 15 where the threading 5 narrows conically in minor diameter as well as in major diameter towards the drill point 14. The threading continues over this transition region until the drill point 14. As the threading starts right at the drill point 14, the screw has very good fastening properties in steel plates and cuts itself way through the material, pushing the steel aside by the gradually increasing diameter of the threading. The transition region has an advantageous length of between 2.5 and 3.9 mm, or between 2.7 and 3.7 mm, or between 3.0 and 3.4 mm, or 3.2 mm.

Typically, the ratio of length of the drill point relatively to the diameter of the drill point is larger than 1.5. It has been found for the present purpose that this ratio is advantageously less than 1.5, for example between 1.3 and 1.5, or between 1.40 and 1.48, or between 1.44 and 1.47, or between 1.45 and 1.46.

Typically for likewise screws, the ratio between the pitch and the major diameter of the threading is more than 0.40. It has been found that the screw for the present purpose for steel and wooden roof constructions as support for the corrugated sheet is less than 0.40, for example between 0.31 and 0.39, or between 0.33 and 0.37, or between 0.34 and 0.36, or 0.35.

An advantageous length of the screw is between 55 and 75 mm, for example between 60 and 66 mm, or between 62 and 64 mm, or 63 mm.

The length of the winding is around half of the entire length of the screw, for example between 40 and 60% of the length of the screw. For a screw having a length of 63 mm, an advantageous length of the threading is 31.5 mm.

The various parameters above are useful each by itself, but may optionally be combined by selecting various of the parameter or by combining all of them for an advantageous screw.

Figure 7A:
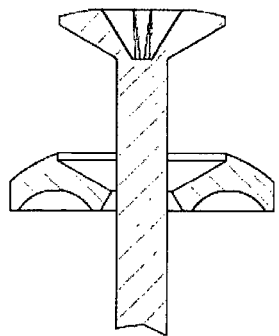
FIGS. 7a, 7b, and 7c illustrate a part of a screw with an alternative washer in a) cross sectional view, b) end view, and c) perspective view.
Figure 7B:
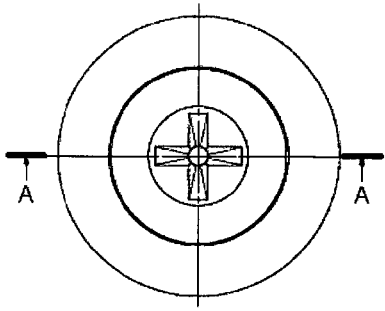
Figure 7C:
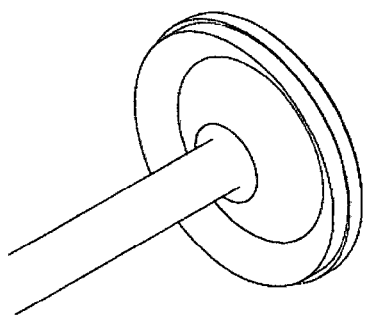

FIG. 7a in cross sectional view, FIG. 7b in top end view, and FIG. 7c in three dimensional view illustrate a head of a screw similar to the screw in FIGS. 6a, 6b, and 6c but with a different washer. This washer is entirely made of polymer, for example PVC (poly vinyl chloride).

The screw is developed for bitumen sheets but will also be useful for other types of sheets, especially corrugated sheets made of metal, plastic or cement.

What is claimed is:

1. A method for fastening a corrugated flexible bitumen sheet on an underlying support structure as part of a roof construction or wall construction, wherein the method comprises:
  providing a screw with a head, a stem, and a threading as part of the stem;
  providing the threading with a rib having a pitch, a minor diameter between windings of the rib, and a major diameter around the rib, wherein the ratio between the pitch and the major diameter is between 0.31 and 0.39;
  wherein the threading has a pitch between 1.2 mm and 1.5 mm;
  providing the screw with a drill point at the tip of the screw and wherein a ratio between a length of the drill point relative to the diameter of the drill point is between 1.40 and 1.48; and driving the screw through the sheet and into the support structure without first forming a hole for the screw in the sheet.

2. The method according to claim 1, wherein the method comprises providing the drill point with a length between 3.0 mm and 4.0 mm.

3. The method according to claim 1, wherein the method comprises providing the drill point with a diameter that is at least 10% smaller than the minor diameter of the threading.

4. The method according to claim 3, wherein:
the threading narrows conically in the minor diameter and in the major diameter towards the drill point; and
the threading continues over a transition region until the drill point.

5. The method according to claim 4, wherein the transition region has a length between 2.5 mm and 3.9 mm.

6. The method according to claim 5, wherein the method comprises providing the screw with:
a length between 55 mm and 75 mm;
the threading having a pitch between 1.2 mm and 1.5 mm; and
a ratio of between 0.4 and 0.6 between the total length of the screw and the length of the threading.

7. The method according to claim 1, wherein the threading is a double thread with two threads being intertwined along the screw.

8. The method according to claim 1, wherein the method comprises providing the screw with a washer, wherein:
the washer has a sealant;
the washer is formed with a downwardly concave ring and a central hole that accommodates the stem of the screw;
the head has a lower part gradually narrowing from the outermost end of the head and towards the stem head; and
the washer has an upper hollow.

9. The method according to claim 8, wherein the method comprises providing a washer with an upper metallic cap and an underlying sealant, wherein:
the upper metallic cap is formed with a downwardly concave ring;
the underlying sealant has a convex upper side corresponding to the concave ring of the metallic cap, wherein the upper side of the sealant is accommodated by the concave lower side of the metallic cap;
the metallic cap and the sealant have a central hole that accommodates the stem of the screw;
the head has a lower part gradually narrowing from the outermost end of the head and towards the stem head; and
the washer has an upper hollow that correspondingly gradually narrows.

* * * * *